United States Patent
Schantz et al.

(10) Patent No.: US 8,326,451 B2
(45) Date of Patent: Dec. 4, 2012

(54) INVENTORY CONTROL AND METHOD

(75) Inventors: Hans Gregory Schantz, Huntsville, AL (US); Peter J. Beucher, Owens Cross Roads, AL (US)

(73) Assignee: Q-Track Corporation, Huntsville, AL (US)

( * ) Notice: Subject to any disclaimer, the term of this patent is extended or adjusted under 35 U.S.C. 154(b) by 0 days.

(21) Appl. No.: 13/153,640

(22) Filed: Jun. 6, 2011

(65) Prior Publication Data

US 2011/0315765 A1    Dec. 29, 2011

Related U.S. Application Data

(60) Continuation-in-part of application No. 11/890,350, filed on Aug. 6, 2007, now Pat. No. 7,957,833, which is a continuation-in-part of application No. 11/473,595, filed on Jun. 23, 2006, now Pat. No. 7,755,552, which (Continued)

(51) Int. Cl.
*G06F 7/00* (2006.01)

(52) U.S. Cl. .......................................... 700/215; 700/229

(58) Field of Classification Search .................. 700/215, 700/214, 213, 225, 229; 455/41.1, 41.2; 342/125, 127; 340/127, 572.2, 825.49
See application file for complete search history.

(56) References Cited

U.S. PATENT DOCUMENTS

| | | | |
|---|---|---|---|
| 5,260,694 A | 11/1993 | Remahl | |
| 5,565,858 A | 10/1996 | Guthrie | |
| 5,725,253 A | 3/1998 | Salive et al. | |
| 5,774,876 A | 6/1998 | Woolley et al. | |
| 5,780,826 A | 7/1998 | Hareyama et al. | |
| 6,353,406 B1 | 3/2002 | Lanzl et al. | |
| 6,496,806 B1 | 12/2002 | Howrwitz et al. | |
| 6,550,674 B1 | 4/2003 | Neumark | |
| 6,669,089 B2 | 12/2003 | Cybulski et al. | |
| 6,724,308 B2 | 4/2004 | Nicholson | |
| 6,739,507 B2 | 5/2004 | Kudyba | |
| 6,825,766 B2 | 11/2004 | Hewitt et al. | |
| 6,901,304 B2 * | 5/2005 | Swan et al. | 700/115 |
| 6,959,862 B2 | 11/2005 | Neumark | |
| 6,972,682 B2 | 12/2005 | Lareau et al. | |
| 7,005,968 B1 | 2/2006 | Bridgelall | |
| 7,151,979 B2 | 12/2006 | Andersen et al. | |
| 2002/0008621 A1 | 1/2002 | Barritz et al. | |
| 2003/0083964 A1 | 5/2003 | Horwitz et al. | |
| 2004/0070503 A1 | 4/2004 | Monahan | |
| 2004/0102870 A1 | 5/2004 | Andersen et al. | |
| 2005/0065861 A1 | 3/2005 | Bann | |
| 2005/0187836 A1 | 8/2005 | Wolfe | |
| 2005/0195083 A1 | 9/2005 | Venture et al. | |
| 2005/0234641 A1 | 10/2005 | Marks et al. | |
| 2005/0240317 A1 | 10/2005 | Kienzle-Lietl | |
| 2005/0242169 A1 | 11/2005 | Michal, III | |
| 2008/0109099 A1 * | 5/2008 | Moshier | 700/103 |
| 2010/0198690 A1 * | 8/2010 | Gilvar et al. | 705/14.58 |
| 2010/0332125 A1 * | 12/2010 | Tan et al. | 701/207 |

FOREIGN PATENT DOCUMENTS

JP    2003418263    11/2004

OTHER PUBLICATIONS

Access, Inc. "Active Radio Frequency Identification (RFID) Powers Productivity and Protection in the Enterprise", White Paper, 11 pages, 2005. Mobile and RFID Data Systems, "Aware / Truck", Mobile and RFID Data Systems, Inc., 2 pages, 2005.
Intermec, "Beyond the Tag—Finding RFID Value in Manufacturing and Distribution Applications," White Paper, 2005.

* cited by examiner (Continued)

*Primary Examiner* — Ramya Burgess

(57) ABSTRACT

An inventory control system and method uses a locating device associated with a mover and identifies an ID tagged asset using an ID reader also associated with the mover. Thus, a single relatively high-cost locating device may be temporarily associated with the asset, enabling precise location of a multitude of assets as a mover traverses an inventory area. The asset location and identification may be associated in a database. The asset location may be refined by using additional measurement devices, for example a forklift height sensor, to determine extension from a locating device. A further embodiment utilizes RFID or barcode technology for the ID tag. The locating device may utilize near-field location technology, signals-of-opportunity, or other RTLS technologies.

22 Claims, 8 Drawing Sheets

Related U.S. Application Data is a continuation-in-part of application No. 11/272,533, filed on Nov. 10, 2005, now Pat. No. 7,307,595, said application No. 11/890,350 is a continuation-in-part of application No. 11/215,699, filed on Aug. 30, 2005, now Pat. No. 7,414,571, which is a continuation-in-part of application No. 10/958,165, filed on Oct. 4, 2004, now Pat. No. 7,298,314, which is a continuation-in-part of application No. 10/355,612, filed on Jan. 31, 2003, now Pat. No. 6,963,301, said application No. 11/890,350 is a continuation-in-part of application No. 11/500,660, filed on Aug. 8, 2006, now Pat. No. 7,538,715, application No. 13/153,640, which is a continuation-in-part of application No. 12/796,643, filed on Jun. 8, 2010, now Pat. No. 8,018,383, and a continuation-in-part of application No. 12/843,002, filed on Jul. 23, 2010, and a continuation-in-part of application No. 12/977,067, filed on Dec. 23, 2010, which is a continuation-in-part of application No. 12/563,960, filed on Sep. 21, 2009, now Pat. No. 7,859,452, which is a division of application No. 11/986,319, filed on Nov. 19, 2007, now Pat. No. 7,592,949, which is a division of application No. 10/958,165, which is a continuation-in-part of application No. 10/355,612, application No. 13/153,640, which is a continuation-in-part of application No. 12/834,821, filed on Jul. 12, 2010, which is a continuation-in-part of application No. 11/473,595, which is a continuation-in-part of application No. 11/272,533, application No. 13/153,640, which is a continuation-in-part of application No. 12/857,528, filed on Aug. 16, 2010, which is a continuation-in-part of application No. 12/834,821, which is a continuation-in-part of application No. 11/473,595, which is a continuation-in-part of application No. 11/272,533, application No. 13/153,640, which is a continuation-in-part of application No. 12/391,209, filed on Feb. 23, 2009.

(60) Provisional application No. 60/637,779, filed on Dec. 21, 2004, provisional application No. 60/404,602, filed on Aug. 19, 2002, provisional application No. 60/404,604, filed on Aug. 19, 2002, provisional application No. 60/841,598, filed on Aug. 31, 2006, provisional application No. 61/470,735, filed on Apr. 1, 2011, provisional application No. 61/067,002, filed on Feb. 25, 2008.

INVENTORY CONTROL AND METHOD

RELATED APPLICATIONS

The present application is a continuation-in-part of U.S. patent application Ser. No. 11/890,350 titled: "Asset localization identification and movement system and method," filed Aug. 6, 2007, now U.S. Pat. No. 7,957,833 issued Jun. 7, 2011 and its antecedents. The present application is a continuation-in-part of U.S. patent application Ser. No. 12/977,067 titled: "Near-field electromagnetic location system and method," filed Dec. 23, 2010 and its antecedents. The present application is a continuation in part of U.S. patent application Ser. No. 12/796,643 titled: "Method and apparatus for determining location using signals-of-opportunity" filed Jun. 8, 2010. The present application is a continuation in part of U.S. patent application Ser. No. 12/843,002 titled: "Malicious attack response system and method," filed Jul. 23, 2010. The present application is a continuation in part of U.S. patent application Ser. No. 12/391,209 titled: "Multiple phase state near-field electromagnetic system and method for communication and location," filed Feb. 23, 2009 and its antecedents. The present application is a continuation in part of U.S. patent application Ser. No. 12/834,821 titled: "Space efficient magnetic antenna method," filed Jul. 12, 2010 and its antecedents. The present application is a continuation in part of U.S. patent application Ser. No. 12/857,528 titled: "Planar antenna system," filed Aug. 16, 2010 and its antecedents. The present application is a continuation in part of U.S. provisional patent application 61/470,735 titled: "Directive electrically small antenna system and method," filed Apr. 1, 2011. All of the above listed US patent and patent applications and their antecedents are hereby incorporated herein by reference in their entirety.

GOVERNMENT LICENSE RIGHTS

The U.S. Government has a paid up license in this invention and the right in limited circumstances to require the patent owner to license others on reasonable terms as provided for by the terms of contract OII-0646339 awarded by National Science Foundation.

BACKGROUND

1. Field of the Invention

The present invention relates generally to systems and methods for automated asset and personnel locating.

2. Background of the Invention

Within a warehouse or logistics system, there is an ongoing need to provide a continuously updated inventory and to know the location of each asset. Proposed methods use a mix of technology in the form of bar codes and the like with software manually updated for location information. Automated location information typically includes active devices that can be too expensive for all but the most valuable assets.

RFID tags and barcodes have been proposed for inventory control in a warehouse or logistics system, because of their low cost and ease of use, but they cannot be read at a distance, requiring physical proximity to read the tag and requiring a fork lift operator to exit the fork lift to operate the barcode reader and manually match the entry with the location. Location equipment can be relatively bulky and costly, too bulky and costly to be assigned one to one with every asset as some assets may be smaller than and cost less than the location equipment. One popular form of location equipment, GPS, lacks the precision to locate an asset to a bin on a shelf and lacks coverage inside a building, particularly a building with a metal roof or other complex metal structure. Location equipment that is not associated and identified with a particular asset lacks a way to identify the asset being located without manual entry.

In view of the foregoing, there is a great need for a location and identification system and method that can provide accurate location information and asset identification at a reasonable cost.

BRIEF SUMMARY OF THE INVENTION

Briefly, the present invention pertains to an inventory control method. The method begins by identifying an asset by associating an identification tag with the asset and reading the identification tag (or ID tag) with an ID tag reader physically associated with a mover. The identification tag may be an RFID tag, or an optical barcode tag. The mover, which may be a forklift, person, robot, or other agent, is associated with an RTLS tag. Then, the method logically associates the asset with the RTLS tag and determines location coordinates for the mover. Finally, the method calls for logically disassociating the asset from the RTLS tag and recording location coordinates of the asset based on the determined location coordinates for the mover. The location coordinates for the asset may be further refined by measured extension from the location coordinates for the mover. The RTLS tag may be an active RTLS tag or a passive RTLS tag. A passive RTLS tag may employ signals-of-opportunity in determining a location.

The invention also teaches an inventory control system comprising an RTLS tag associated with a mover (for determining location of the mover), an ID tag reader associated with the mover (for determining identification of an asset from an ID tag associated with an asset), and a computer in communication with the RTLS tag and the ID tag reader for recording a location of the asset. The computer is configured for associating the location of the mover with the identification of the asset. The RTLS tag may be an active RTLS tag for transmitting a location signal. In this embodiment, a set of locator receivers receive the location signal and convey measurements of the receiving signal to a computer. The computer determines location coordinates of the active RTLS tag based on the measurements of the location signal. In a further embodiment, locator receivers determine location coordinates of the active RTLS tag based on the measurements of the location signal, and convey the coordinates to the computer.

The inventory control system may also employ a passive RTLS tag as the RTLS tag. The passive RTLS tag may employ signals-of-opportunity in determining a location. Here again, the identification tag may be and RFID tag, or an optical barcode tag. Determining the location coordinates for the asset may utilize measured extension from the location coordinates for the mover, which may be a forklift, person, robot, or other agent. In an alternate embodiment, an inventory control system comprises an active RTLS tag for transmitting a location signal, means for determining location coordinates for the active RTLS tag based on the location signal, an ID tag reader in communication with a computer, said ID tag reader for reading an asset identification from an ID tag associated with an asset in an inventory area; and a mover for carrying the ID tag reader and the active RTLS tag to a plurality of locations within the inventory area. The location coordinates for the active RTLS tag are determined by the means for determining the location coordinates while the active RTLS tag is in a known relative proximity to the asset. The inventory control system obtains an estimation of location coordinates for the asset from the location coordinates for the active RTLS tag. The estimate may include the step of determining location coordinates for the asset by measured extension from the location coordinates for the mover, which may be a forklift, person, robot, or other agent. Finally, the inventory control system is configured for associating the location coordinates for the asset with the asset identification.

These and further benefits and features of the present invention are herein described in detail with reference to exemplary embodiments in accordance with the invention.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE PREFERRED EMBODIMENTS

Overview of the Invention

Figure 1:
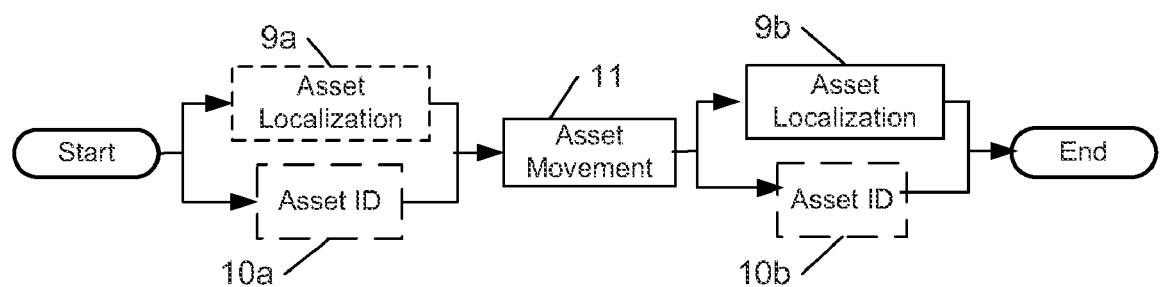
FIG. 1 is an exemplary process flow diagram showing an asset identification, localization, and movement process in accordance with the present invention.

The present invention provides a system for automated positioning of potentially thousands of items in a logistics, manufacturing, health care, or other setting by combining the best features of asset identification technology (for instance, radio frequency identification (RFID) barcode tags) with the capabilities of real-time location systems (RTLS) to provide a tow cost system for maintaining location awareness of a multitude assets. This overview surveys both ID tags well-suited for use in an identification system or method, as well as a variety of RTLS approaches.

Asset Identification Technology

A variety of asset identification tag technologies are known in the art, including Radio Frequency Identification (RFID), barcode, and optical character reading (OCR).

REID tags are typically low cost passive tags that can be excited by RF energy, typically from within a meter or so and respond by transmitting an number and potentially other status information. Certain otherwise "passive" RFID tags employ a long life battery to increase the strength of the radiated signal upon interrogation. Such tags should be considered subsumed under the term "passive tag," "ID tag," or equivalently, "identification tag."

Barcode tags are typically optical and are read optically. Barcode tags include the familiar Universal Product Code (UPC) barcodes of the supermarket and also include numerous standards and formats including two dimensional barcodes capable of high density information. 2D barcodes include "Aztec Code," "Intercode," "QR Codes," Datamatrix, EZ Code, and many others.

Numerous other similar asset identification tag technologies have been developed and are continually being developed for the numerous applications of these devices. In some cases, an asset identification device (i.e. an "ID tag reader," or an "interrogator") will employ multiple discrete asset identification technologies to enable a successful identification. Within this disclosure, these devices are collectively referred to as identification tags whether they are applied as tags or stick on labels or built into the asset, or otherwise associated with the asset. Identification tags are typically advantageous for their very low cost, low weight and small size.

Real Time Location System Technology

Real-time location system (RTLS) devices track an object's movement and measure the object's location to sufficient accuracy to identify the position of the object within the correct bin or region in the storage area or elsewhere. An important sub-set of RTLS use active wireless devices. Active RTLS may employ 2.4 GHz signals (for instance, Wi-Fi®, Bluetooth®, or ZigBee®), optical, IR, or laser signals, acoustic signals, ultra-wideband (UWB) signals, near-field signals, or other wireless signals. Active RTLS methods may include time-of-flight, time-difference-of-arrival, Received Signal Strength Indicator (RSSI), multilateration, line-of-sight, direction finding, radar, RF fingerprinting, near-field electromagnetic ranging (NFER®) technology, or other methods. Depending on the context, any of these active RTLS technologies may be suitable, however an emerging approach shows great promise.

Incumbent location providers take high frequency, short wavelength wireless systems, like Wi-Fi or UWB, that were optimized for high data rate communications, and they try to use them to solve the challenging problem of indoor wireless location. But location and communication are two fundamentally different problems requiring fundamentally different solutions, particularly in the most challenging RF propagation environments.

Applicants have pioneered a solution. NFER® technology offers a wireless physical layer optimized for real-time location in the most RF hostile settings. NFER® systems exploit near-field behavior within about a half wavelength of a tag transmitter to locate a tag to an accuracy of 1-3 ft, at ranges of 60-200 ft, all at an infrastructure cost of $0.50/sqft or less for most installations. NFER® systems operate at low frequencies, typically around 1 MHz, and long wavelengths, typically around 300 m. FCC Part 15 compliant, low-power, low frequency tags provide a relatively simple approach to wireless location that is simply better in difficult environments.

Low frequency signals penetrate better and diffract or bend around the human body and other obstructions. This physics gives NFER® systems long range. There's more going on in the near field than in the far field. Radial field components provide the near field with an extra (third) polarization, and the electric and magnetic field components are not synchronized as they are for far-field signals. Thus, the near field offers more trackable parameters. Also, low-frequency, long-wavelength signals are resistant to multipath. This physics gives NFER.® systems high accuracy. Low frequency hardware is less expensive, and less of it is needed because of the long range. This makes NFER® systems more economical in more difficult RF environments, Near field electromagnetic ranging was first fully described in applicant's "System and method for near-field electromagnetic ranging" (Ser. No. 10/355,612, filed Jan. 31, 2003, now U.S. Pat. No. 6,963,301, issued Nov. 8, 2005), This application is incorporated in entirety by reference. Some of the fundamental physics underlying near field electromagnetic ranging was discovered by Hertz [Heinrich Hertz, Electric Waves, London: Macmillan and Company, 1893, p. 152]. Hertz noted that the electric and magnetic fields around a small antenna start 90 degrees out of phase close to the antenna and converge to being in phase by about one-third to one-half of a wavelength. This is one of the fundamental relationships that enable near field electromagnetic ranging. A paper by one of the inventors [H. Schantz, "Near field phase behavior," 2005 IEEE Antennas and Propagation Society International Symposium, Vol. 3A, 3-8 Jul. 2005, pp. 237-240] examines these near-field phase relations in further detail. Link laws obeyed by near-field systems are the subject of another paper [H. Schantz, "Near field propagation law & novel fundamental limit to antenna gain versus size," 2005 IEEE Antennas and Propagation Society International Symposium, Vol. 3B, 3-8 Jul. 2005, pp. 134-137]. In addition to an active RTLS tag (or fixed locator-mobile beacon) architecture, the teachings of U.S. Pat. No. 6,963,301 encompass a passive location tag (or fixed beacon-mobile locator) architecture. In this architecture, the passive location tag (or passive RTLS tag) is a receiver that may be incorporated or associated with a vehicle or person to provide position information from signals emitted by fixed transmit beacons. A beacon my be an uncooperative source of electromagnetic radiation, like a signal from an AM broadcast station or other signal-of-opportunity. In the sense taught by Applicants, a "passive RTLS tag" is passive in the sense that it does not emit signals in the process of obtaining location data, rather it receives and characterizes signals so as to determine location of an associated mover. Determination of location may be performed either locally (within the passive RTLS tag) or remotely (by conveying signal characterization data to a remote server for location determination),.

Complicated propagation environments do tend to perturb the near-field phase relations upon which NFER® systems rely. Applicants have overcome this problem using calibration methods described in "Near-field electromagnetic positioning system and method" (Ser. No. 10/958,165, filed Oct. 4, 2004, now U.S. Pat. No. 7,298,314, issued Nov. 20, 2007). Additional calibration details are provided in applicant's "Near-field electromagnetic positioning calibration system and method" (Ser. No. 11/968,319, filed Nov. 19, 2007, now U.S. Pat. No. 7,592,949, issued Sep. 22, 2009). Still further details of this calibration are provided in applicant's co-pending "Near-field electromagnetic calibration system and method" (Ser. No. 12/563,960 filed Sep. 21, 2009, now U.S. Pat. No. 7,859,452, issued Dec. 28, 2010).

Applicant's unique algorithms enable innovative techniques for displaying the probability density and other aspects of location information, as described in applicant's "Electromagnetic location and display system and method," (Ser. No. 11/500,660, filed Aug. 8, 2006, now U.S. Pat. No. 7,538,715, issued May 26, 2009).

Applicants discovered that orthogonal magnetic antennas offer unique advantages for transmission and reception in real-time location systems and elsewhere. Details may be found in "Near-field location system and method," (Ser. No. 11/272,533, filed Nov. 10, 2005, now U.S. Pat. No. 7,307, 595, issued Dec. 11, 2007). Additional compact antenna designs are shown in applicant's "Space efficient magnetic antenna system," (Ser. No. 11/473,595, filed Jun. 22, 2006, now U.S. Pat. No. 7,755,552 issued Jul. 13, 2010). Other antenna concepts of value in an RTLS and elsewhere are disclosed in Applicant's co-pending "Planar antenna system," (Ser. No. 12/857,528, Aug. 16, 2010), and "Space efficient magnetic antenna method," (Ser. No. 12/834,821, filed Jul. 12, 2010). Applicant's "Directive electrically small antenna system and method," (Provisional Patent Application 61/470,735 filed Apr. 1, 2011) presents further antennas of use in conjunction with an RTLS.

Further, the phase properties of near-field signals from orthogonal magnetic and other multiple antenna near-field transmission signals enable additional phase comparison states that can be used for location and communication, as described in applicant's co-pending "Multi-state near-field electromagnetic system and method for communication and location," (Ser. No. 12/391,209, filed Feb. 23, 2009).

Near-field electromagnetic ranging is particularly well suited for tracking and communications systems in and around standard cargo containers due to the outstanding propagation characteristics of near-field signals. This application of NFER® technology is described in applicant's "Low frequency asset tag tracking system and method," (Ser. No. 11/215,699, filed Aug. 30, 2005, now U.S. Pat. No. 7,414, 571, issued Aug. 19, 2008).

Applicants have also discovered that near-field electromagnetic ranging works well in the complicated propagation environments of nuclear facilities and warehouses. An NFER® system provides the RTLS in a preferred embodiment of applicants' co-pending "System and method for simulated dosimetry using a real-time location system" (Ser. No. 11/897,100, filed Aug. 29, 2007). An NFER® system also provides the real-time location system in a preferred embodiment of applicants' "Asset localization, identification, and movement system and method" (Ser. No. 11/890,350, filed Aug. 6, 2007, now U.S. Pat. No. 7,957,833 issued Jun. 7, 2011).

In addition, applicants recently discovered that AM broadcast band signals are characterized by "near field" behavior, even many wavelengths away from the transmission tower.

These localized near-field signal characteristics provide the basis for a "Method and apparatus for determining location using signals-of-opportunity" (Ser. No. 12/796,643, filed Jun. 8, 2010). The techniques therein disclosed enable an RTLS comprising a mobile tag receiver employing signals-of-opportunity to determine precise location or position. More generically, passive receiver tag RTLS employing an uncooperative signal is described in Applicant's co-pending "Near-field electromagnetic location system and method," (Ser. No. 12/977,067, filed Dec. 23, 2010) along with other improvements in the RTLS arts. Perhaps the best known passive receiver RTLS is the Global Positioning System (GPS). GPS would be suitable for use as a passive RTLS tag in the present invention in an outdoor or other environment where GPS signals are available. Other examples of passive RTLS tags include those operating by receiving RF signals and determining location through RF fingerprinting, RSSI or other suitable techniques.

Applicants also discovered that a path calibration approach can yield successful location solutions particularly in the context of first responder rescues, as detailed in applicant's "Firefighter location and rescue equipment" (Ser. No. 13/021, 711, filed Feb. 4, 2011).

Applicant's "Malicious attack response system and method," (Ser. No. 12/843,002 filed Jul. 23, 2010) discusses innovative means of securing a computer network, such as an inventory or management control system, from an attack outside the network.

All the above referenced US patents are incorporated herein by reference in their entirety.

Alternate technology RTLS tags may employ any of a variety of RTLS technologies. One example is transponder RTLS in which the RTLS tag both transmits and receives signals as in a time-of-flight ranging or multi-lateration system or a radar, sonar, or laser ranging system. Other examples of alternate technology RTLS tags include, but are not limited to, systems employing inertial tracking, magnetic compasses, stereo vision tracking, or other such techniques.

In prior art (see for instance Horwitz U.S. Pat. No. 6,496, 806), an ID tag reader has been employed to read tags associated with assets, read a multitude of similar tags associated with locations, and then correlate locations with assets. Thus Horowitz must employ a vast multitude of distinct identification tags to achieve the same benefit as applicant's single RTLS tag associated with a mover. Further, the characteristics that make a good identification technology (high reliability identification at short range or line-of-sight) are not the same as the characteristics of a good location technology (high location at long range or where line-of-sight may be restricted or blocked). Thus the present invention teaches that two distinct approaches should be merged, one optimized for identification, and one optimized for localization.

RTLS tags are typically larger in size than RFID tags and (whether passive or active) typically require electrical power from batteries or another co-located power source. The system of the present invention applies the advantages of tow cost and small size of the ID tag to each asset (where low cost and small size are most needed) and incorporates the advantages of the RTLS by placing the positioning system on the mover where the cost of the positioning system can be applied to a virtually countless number of assets by repeated usages. Thus, the benefits and shortcomings of the identification and localization devices are complementary—each device overcomes the shortcomings of the other device, enabling a system that would not be practical with either single device type alone.

Asset Identification, Localization, And Movement Process

FIG. 1 is an exemplary process flow diagram showing an asset identification, localization, and movement process in accordance with the present invention. The steps of FIG. 1 may be performed in any order, as desired. Of significance with respect to the steps of FIG. 1 is that the localization equipment is installed on or otherwise associated with the mover, as is the ID tag reader. A low cost ID tag is attached or otherwise associated with the asset. Referring to FIG. 1, the process may begin with asset identification 10a and may also optionally include asset localization 9a. Typically, a worker is instructed to move an asset to a new location within a warehouse. The worker first finds the asset by going to the last known location of the asset 9a and looking for the asset according to an asset identification 10a (typically a barcode number or RFID). When the asset is found, and identified 10a, the asset is picked up and moved 11 to the new location. The new location may not be precisely identified until the worker arrives at the area and finds an empty spot. Upon placing the asset at the new location, the asset location is measured 9b precisely and recorded in a database. The asset identification may then be optionally verified 10b. In an alternative sequence, the asset may be identified 10b at the time of final placement and localization 9b. (Localization means measuring the location of the asset in coordinates meaningful to the facility.) Other sequences of localization and identification may be desirable for other scenarios. Thus, the localization and identification is accomplished without installing expensive active trackers on each asset. A particularly novel and innovative feature of Applicants' invention is that the association of the RTLS tag with the ID tagged asset is a temporary one that exists only for the duration of the process. That this combination is transient and temporary is both non-obvious and provides Applicants' approach with benefits hitherto unrealizable by the prior art.

Figure 2:
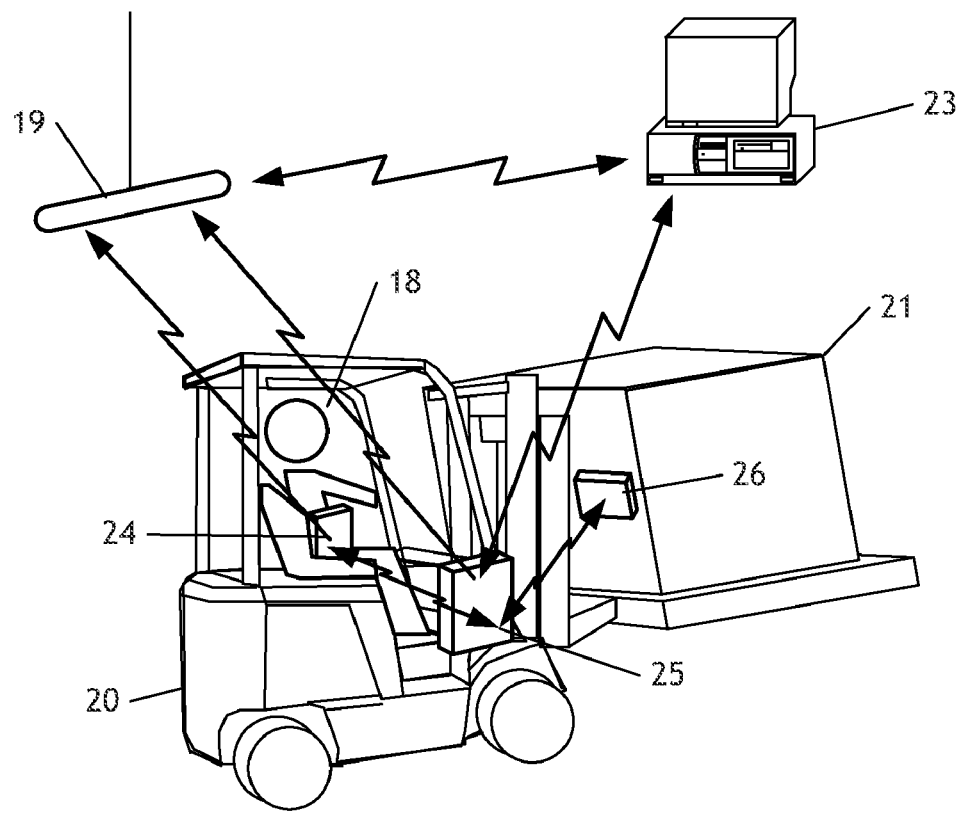
FIG. 2 is an exemplary schematic diagram describing one embodiment a system for identification, localization, and movement of an asset.

FIG. 2 is an exemplary schematic diagram describing one embodiment a system for identification, localization, and movement of an asset. The embodiment of FIG. 2 comprises a worker 18, a forklift 20, an active RTLS tag 24 co-located with worker 18, a localizing ID reader (LIDR) 25, one or more locator receivers 19, a computer 23, and an ID tag 26 co-located. with an asset 21. The worker 18 with or without the vehicle (e.g. forklift 20) acts as a movement agent capable of moving asset 21 between locations. The LIDR 25 is a device with both active location capability and ID tag reading capability housed in the same unit, thus eliminating issues relating to associating the ID tag reader with the location tag.

An active RTLS tag 24 co-located with worker 18 works in conjunction with locator receiver 19 and computer 23 to localize worker 18 and thus associated asset 21. A LIDR 25 co-located with forklift 20, in conjunction with a locator receiver 19 and computer 23, may also serve for localizing forklift 20 and associated asset 21. The LIDR 25 and ID tag 26 co-located with asset 21 cooperate to serve as identifying means for asset 21. Whereas, FIG. 2 illustrates the possible use of both an active RTLS tag associated with the worker and a LIDR associated with the forklift, only one locator is necessary.

As shown in FIG. 2, the LIDR is mounted on the body of the forklift where the LIDR can sense tags on assets loaded at the lower position of the lift. Alternatively, the LIDR may be located on the lift to be lifted up with the asset and positioned forward next to the asset to better represent the actual position of the asset.

In operation, the active RTLS tag 24 (associated with a movement agent, such as a worker 18) transmits a signal to one or more locator receivers 19, as necessary to determine a location measurement. A computer 23 accepts data from at least one locator receiver 19 and determines the location of active RTLS tag 24 and, thus, the movement agent, such as a worker 18. If asset localization process 9a and/or 9b is performed in conjunction with asset identification process 10a and/or 10b, then associated asset 21 becomes both localized and identified. By performing asset localization process 9a and 9b before and after asset movement process 11, an accurate location for asset 21 may be maintained in computer 23.

In alternative embodiments, asset identification process 10 may be performed by an active RTLS tag 24 associated with the asset 21 (rather than the mover) transmitting a signal to a locator receiver 19. The signal may be modulated so as to uniquely identify asset 21. Alternatively, a generic signal may be transmitted at a unique frequency or at a unique time so as to uniquely identify asset 21. A data interface 54 to active RTLS tag 24 may allow active RTLS tag 24 to respond on command from computer 23 so as to uniquely identify asset 21.

In a preferred embodiment, however, asset identification process 10 may be performed by an ID tag reader 28 associated in location with a movement agent, such as worker 18. Physical association of the ID tag reader with the movement agent may be by being carried by the worker or by being mounted on a forklift operated by the worker or other similar arrangement. Logical association of the active RTLS tag information with the ID tag reader information may be made possible by a data exchange or handshaking between ID tag reader 28 and active RTLS tag 24, as each device will have a serial number identifying the device. In alternate embodiments, ID tag reader 28 may convey data to computer 23 intermediate active RTLS tag 24, i.e., by sending data through active RTLS tag 28, thus providing associated location and identification data for asset 21. In further embodiments, ID tag reader 28 may provide identification data directly to computer 23 in conjunction with adequate identifying information pertinent to active RTLS tag 24 to enable computer 23 to associate a measured location of active RTLS tag 24 with identification information relevant to asset 21. For example, each device may separately communicate with the computer over the network, but the two devices may be defined or configured in software as being fixed to the same forklift.

In still further alternate embodiments, association may follow from co-locating functionality of ID tag reader 28 and active RTLS tag 24 in a localizing ID reader, LIDR 25. The LIDR 25 is a single unit with active RTLS tag and ID tag reading capability. A worker 18 with co-located active RTLS tag 24 and transportation vehicle such as a forklift 20 with co-located LIDR 25 may similarly be associated by a data exchange or handshaking between active RTLS tag 24 and LIDR 25, the results of said data exchange or handshaking being conveyed to computer 23.

ID tag reader 28 reads an ID tag 26 associated with asset 21. ID tag 26 may be a bar code, an RFID tag, an optical pattern tag, an alternate technology tag, or some combination of ID tag modalities. One combination of particular value is a bar code or optical pattern combined with an RFID tag.

The asset identification, localization, and movement process continues with asset movement process 11. Asset movement process 11 comprises a movement agent acting so as to transport asset 21. Typical movement agents include, but are not limited to, a worker 18 either solo or in conjunction a transporter such as a hand truck, forklift 20, pallet jack, crane, reach truck, side loader, order picker, or other material handler or lifter. Further benefits and features of the asset identification, localization, and movement process may be better understood with reference to an illustrative logistics process.

An Illustrative Logistics Process

Figure 3:
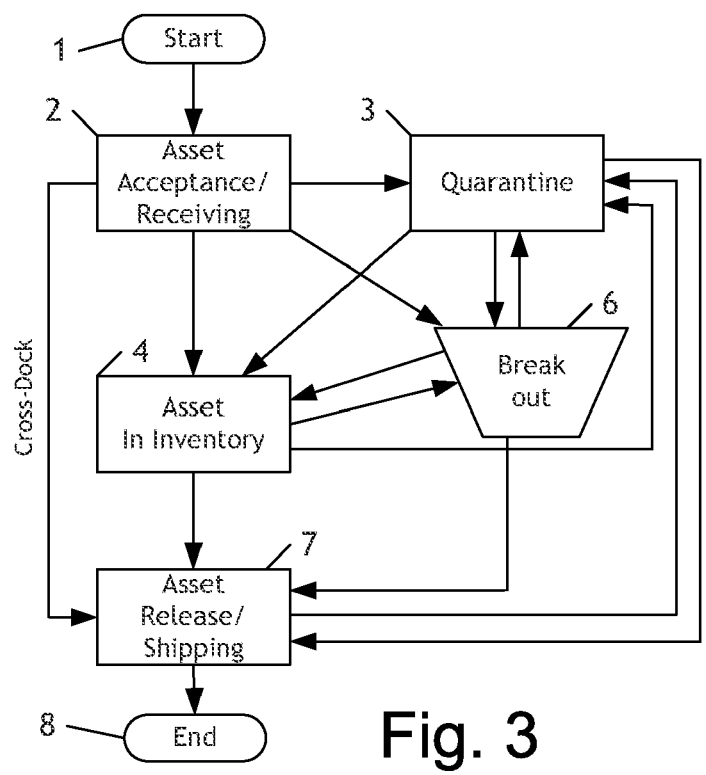
FIG. 3 is a process flow diagram showing an illustrative logistics process encompassing the asset identification, localization, and movement process of FIG. 1.

FIG. 3 is a process flow diagram showing an illustrative logistics process encompassing the asset identification, localization, and movement process of FIG. 1. Each movement line indicated between two of the blocks may be performed in accordance with the identification, localization and movement process of the present invention. The illustrative logistics process is not intended to be a comprehensive or universally applicable description of all logistics processes. Rather, the illustrative logistics process of FIG. 3 is intended to illustrate the potential benefits of the asset identification, localization, and movement process in a logistics process.

The illustrative logistics process begins with start block 1 and proceeds with asset acceptance and receiving process 2 in which an asset in receiving, like asset 21, is received and accepted. A critical aspect of asset acceptance and receiving process 2 is a determination of where an asset in receiving should go next. If an asset in receiving has been mistakenly shipped, if paperwork accompanying an asset in receiving is flawed, or if some other significant problem is identified with an asset in receiving, then the illustrative logistics process may continue with a quarantine process 3. If an asset in receiving is to be stored for sufficient time to justify placing an asset in receiving into inventory, then the illustrative logistics process continues with asset in inventory process 4. If an asset in receiving is to be immediately released or shipped, then the illustrative logistics process may continue with a cross-dock transfer to an asset release and shipping process 7. If an asset in receiving comprises sub-assets that require repackaging, subdivision, or recombination, then the illustrative logistics process may continue with asset break-out process 6.

The illustrative logistics process further comprises a quarantine process 3. In a quarantine process 3, an asset in quarantine (like asset 21) is placed in secure storage because of some problem identified in paperwork, a mis-shipment, or other problem necessitating secure storage of an asset in quarantine. If the problem is satisfactorily resolved, the illustrative logistics process may continue with asset in inventory process 4. Alternatively, if an asset in quarantine comprises sub-assets that require repackaging, subdivision, or recombination, then the illustrative logistics process may continue with asset break-out process 6. Finally if an asset in quarantine is to be released, shipped, or returned to the point of origin, then the illustrative logistics process may continue with a cross-dock transfer to an asset release and shipping process 7.

The illustrative logistics process further comprises an asset in inventory process 4. An asset in inventory process 4 involves an asset (like asset 21) being stored, for instance, in a pallet rack (like pallet rack 66), or in a staging or other storage area. If an asset in inventory has been mistakenly shipped, if paperwork accompanying an asset in inventory is flawed, or if some other significant problem is identified with an asset in inventory, then the illustrative logistics process may continue with a quarantine process 3. If an asset in inventory is to be released or shipped, then the illustrative logistics process may continue with an asset release and shipping process 7. If an asset in inventory comprises sub-assets that require repackaging, subdivision, or recombination, then the illustrative logistics process may continue with asset break-out process 6.

An asset in inventory may be subject to a periodic identification such as in asset identification process 10. Further, an asset in inventory may be subject to a periodic localization such as in asset localization process 9. This realization enables an effective system and method for inventory control without necessarily requiring an asset to be moved.

The illustrative logistics process further comprises an asset break-out process 6. Asset break-out process 6 involves an asset in break-out (like asset 21) being divided into sub-assets and being repackaged, processed, sub-divided, and/or recombined so as to create new assets. For instance, an asset in break-out may be a pallet comprising six particular goods requiring repackaging to go to six different destinations. One asset in break out may be divided into multiple assets in break-out, multiple assets in break-out may be combined into a smaller number of assets in break-out, or more complicated combinations and divisions are possible.

If an asset in break-out is to be released or shipped, then the illustrative logistics process may continue with an asset release and shipping process 7. If an asset in break-out has been mistakenly shipped, if paperwork accompanying an asset in break-out is flawed, or if some other significant problem is identified with an asset in break-out, then the illustrative logistics process may continue with a quarantine process 3. If an asset in break-out is to be stored for sufficient time to justify placing an asset in receiving into inventory, then the illustrative logistics process continues with asset in inventory process 4.

The illustrative logistics process further comprises asset release and shipping process 7. Asset release and shipping process 7 involves an asset in shipping being processed for release and shipment. If an asset in shipping is shipped, then the illustrative logistics process terminates in end block 8. If an asset in shipping has been mistakenly subjected to asset release and shipping process 7, then the illustrative logistics process may continue with a quarantine process 3 in which the further disposition of an asset in shipping may be decided.

An Illustrative Logistics Facility

Figure 4:
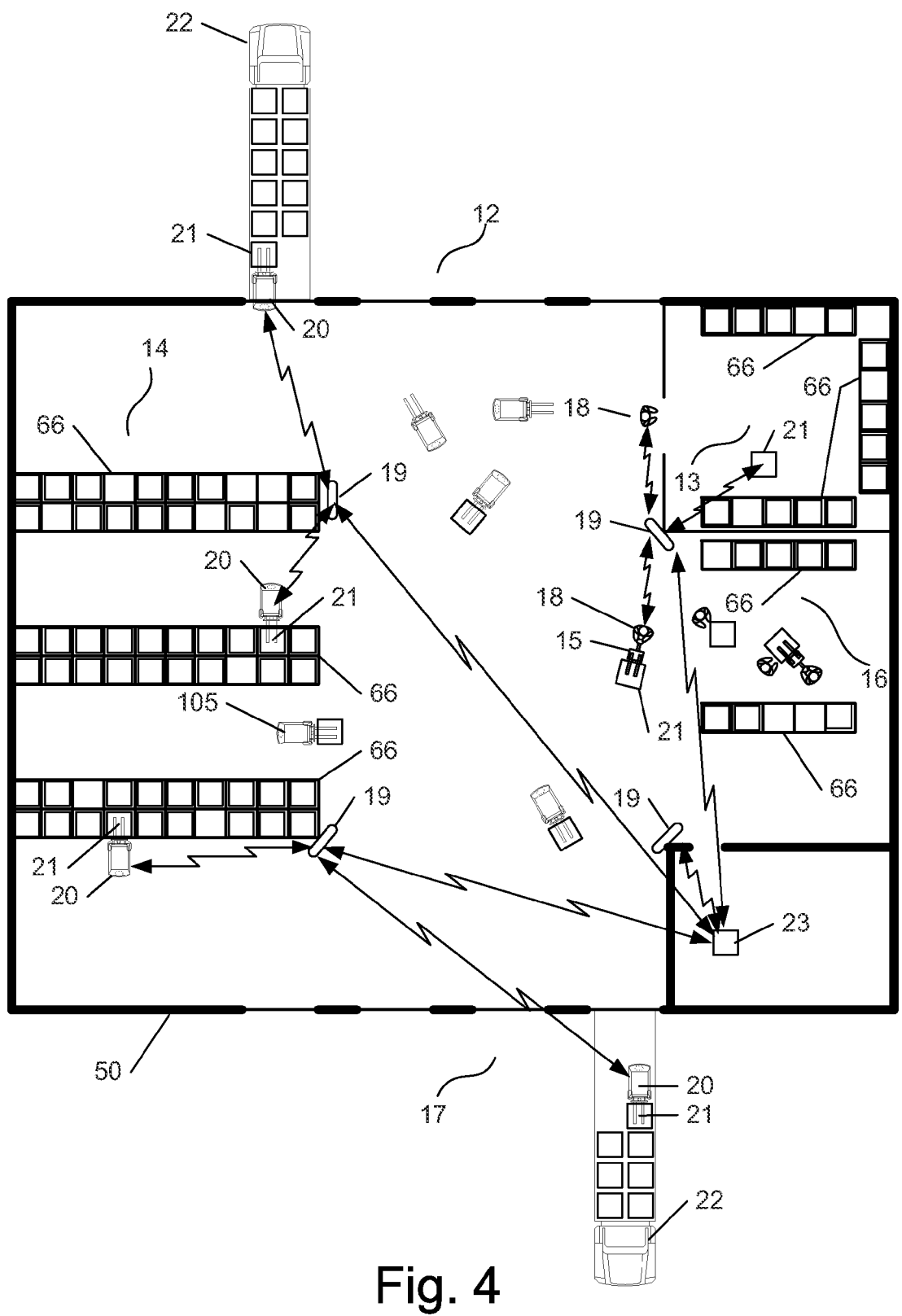
FIG. 4 is a schematic diagram of an illustrative logistics facility.

FIG. 4 is a schematic diagram of an illustrative logistics facility 50. The illustrative logistics facility 50 is not intended to be comprehensive and universally applicable to all logistics facilities. Rather, the illustrative logistics facility of FIG. 4 is intended to illustrate the benefits of the asset identification, localization, and movement process in a typical logistics facility, either stand-alone or as a department in a larger business or other enterprise.

The illustrative logistics facility 50 comprises an acceptance and receiving area 12, inventory area 14, quarantine zone 13, break-out area 16, and release and shipping area 17. The illustrative logistics facility 50 further includes assets (like asset 21), workers (like worker 18), forklifts (like forklift 20), robotic forklifts (like robotic forklift 105), hand trucks (like hand truck 15), locator receivers (like locator receiver 19), pallet racks (like pallet rack 66), and a computer (like computer 23).

In receiving area 12, forklift 20 picks up asset 21 from truck 22. A LIDR 25 co-located with forklift 20 relays location and identification information via locator receiver 19 to computer 23. Computer 23 may send data to LIDR 25 to instruct worker 18 where to transport asset 21. When forklift 20 drops off asset 21 at a destination, a LIDR 25 co-located with forklift 20 relays location information via locator receiver 19 to computer 23. In alternate embodiments, a LIDR 25 co-located with forklift 20 may further relay identification information via locator receiver 19 to computer 23 as a double-check or confirmation of the original identification when forklift 20 drops off asset 21.

In asset break-out area 16, a worker 18 is leaving with an asset 21 conveyed by a hand truck 15. Worker 18 identifies asset 21 by using ID tag reader 28. Active RTLS tag 24 co-located with worker 18 relays location information on worker 18 via locator receiver 19 to computer 23.

Note that in accordance with the present invention, particularly valuable assets may warrant continuous monitoring and may have associated thereon a dedicated active RTLS tag 24, which may include identification information within the active RTLS tag. For example, in quarantine area 13, a particularly valuable asset 21 with a co-located active RTLS tag 24 relays location information on worker 18 via locator receiver 19 to computer 23. Active RTLS tag 24 may include an on board accelerometer 53 to detect motion and alert computer 23 via locator receiver 19 if motion occurs. A worker 18 entering quarantine area 13 may be tracked to maintain a security log of those having entered quarantine area 13 or to ensure that only authorized workers (like worker 18) have entered quarantine area 13.

An additional benefit of Applicant's system is that a robotic forklift (like robotic forklift 105), may additionally employ a real-time location system (RTLS) (like that enabled by active RTLS tag 24 and a locator receiver 19) in support of autonomous navigation and guidance. Further, determining the location of workers (like worker 18) enables a collision avoidance or proximity warning system, avoiding worker-forklift collisions.

Asset Identification, Localization, And Movement System Features

Figure 5:
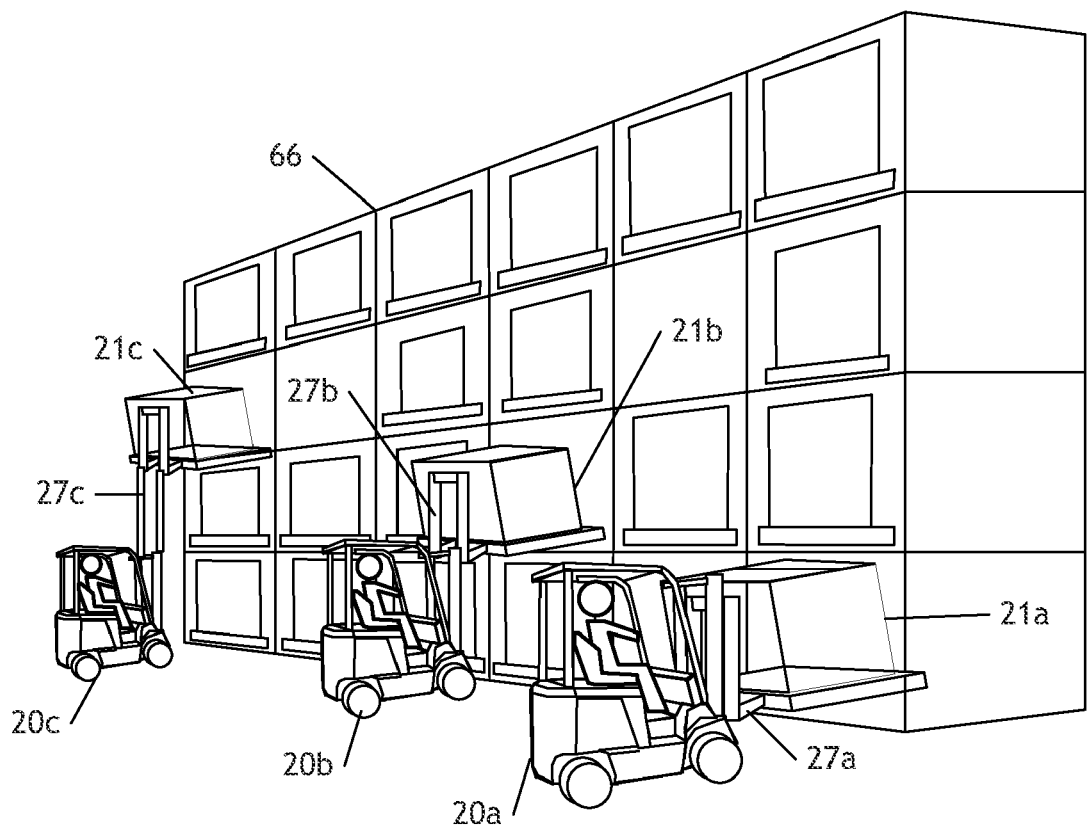
FIG. 5 is an exemplary schematic diagram describing forklifts placing assets at various levels in a rack.

FIG. 5 is an exemplary schematic diagram describing forklifts placing assets at various levels in a rack. Asset location in the vertical dimension may require additional location determination resources. In one embodiment, locator receivers 19 may be placed at the floor level and an additional set may be placed at the ceiling level to provide vertical received signal differences to resolve the vertical dimension.

In a further alternative, a set of locator receivers may be placed in a plane with sufficient numbers to triangulate in three dimensions. However, dilution of precision limits the ability of the tracking system to determine elevation using location devices co-located in a common horizontal plane.

In a third alternative embodiment, elevation of an asset 21 in a pallet rack 66 may be determined by sensing the forklift elevation with an elevation sensor. Typically, an elevation sensor may be coupled to the mechanical lift 27 for the forklift 20. The elevation signal is then conveyed to the computer 23 either directly via the network or through the active RTLS tag 24 or LIDR 25 associated with the forklift 20. As shown in FIG. 5, three forklifts 20a-20c are unloading three assets 21a-21c into three different heights in pallet rack 66. For each different height, the respective fork lifting mechanisms 27a-27c are extended to different lengths as may be measured by a sensor coupled to the lift mechanism (sensor internal to mechanism 27a-27c).

In a further alternative, where the lift device has multiple dimensions of lift and/or extension or travel, such as a crane, the extension dimensions may be sensed and added to the location determined from the localizer receivers to determine the asset location. To add horizontal extension information, a direction must also be known.

In a further alternative, the active RTLS tag signal may be directional, indicating the horizontal orientation (azimuth) of the active RTLS tag by using radio direction techniques. In one embodiment the azimuth of the active RTLS tag is determined by a magnetic compass sensor. In another embodiment the azimuth is determined by radio direction signals.

In a further aspect, the location of the active RTLS tag that is measured when the asset is placed in the destination location may be offset from the actual asset location. For example, if the active RTLS tag is one meter back from the forks of the forklift, the position measured is actually in the aisle in front of the asset. However, the offset may be accommodated by noting that the forklift may be operated to consistently measure asset position from directly in front of each respective asset. Thus, each asset may be paired one to one with a corresponding location such that the corresponding locations for each asset are not ambiguous. Further, a forklift returning to a measured location for a particular asset will be in position to load the identified asset even though the asset may actually be extended from the measured location.

Figure 6A:
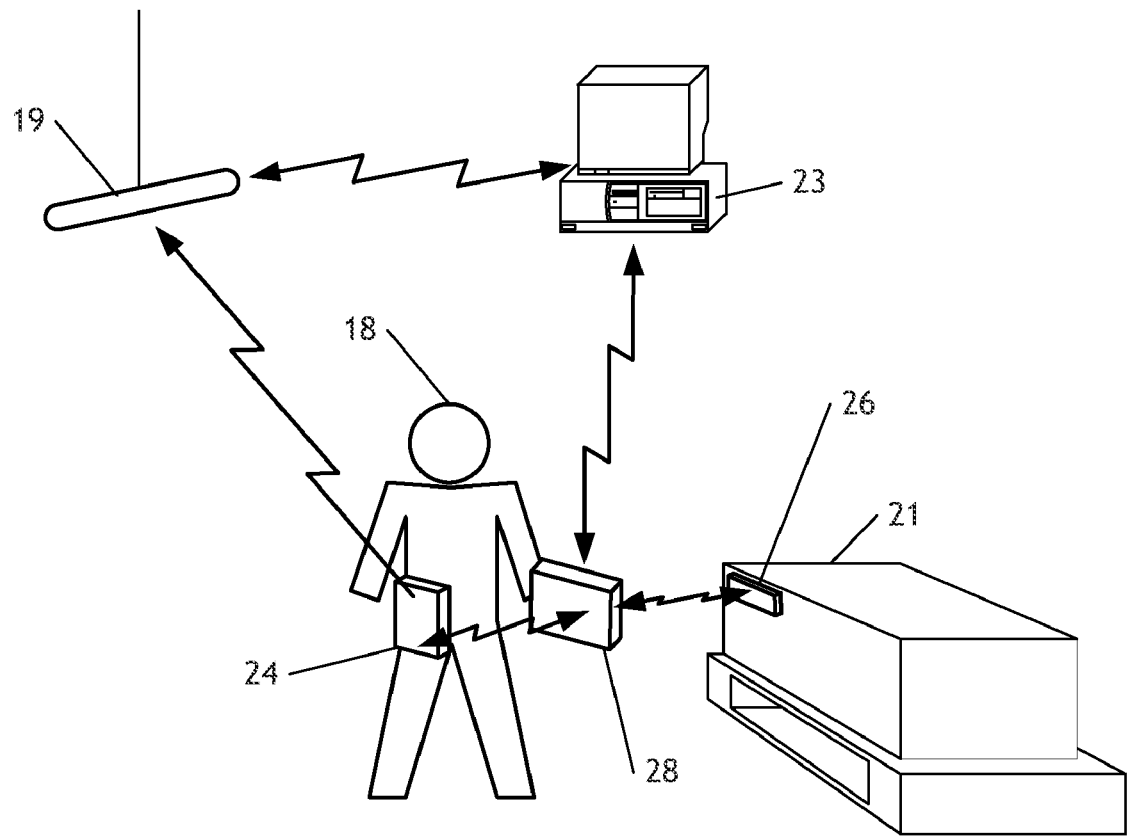
FIG. 6A is a schematic diagram showing a first exemplary embodiment asset and personnel localizing system involving a worker using an ID tag reader.

FIG. 6A is a schematic diagram showing a first exemplary embodiment asset and personnel localizing system involving a worker 18 using an ID tag reader 28 to identify an asset 21. A first alternate embodiment system for identification, localization, and movement of an asset 21 comprises a worker 18, an active RTLS tag 24 co-located with worker 18, an ID tag reader 28, a locator receiver 19, a computer 23, and an ID tag 26 co-located with an asset 21.

An active RTLS tag 24 co-located with worker 18 works in conjunction with locator receiver 19 and computer 23 to serve as localizing means, localizing worker 18 and thus associated asset 21. AN ID tag reader 28 and an ID tag 26 co-located with asset 21 cooperate to serve as identifying means for asset 21.

Figure 6B:
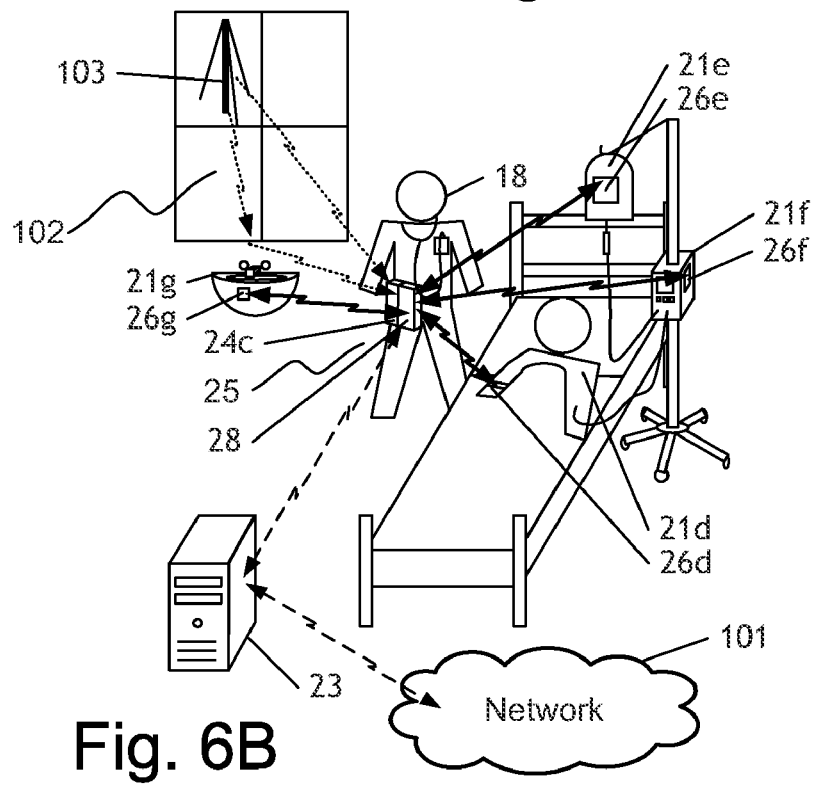
FIG. 6B is a schematic diagram showing a second exemplary embodiment asset and personnel localizing system involving a healthcare worker using a localizing ID reader (LIDR) to identify and localize a variety of assets.

FIG. 6B is a schematic diagram showing a second exemplary embodiment asset and personnel localizing system involving a healthcare worker 18 using localizing ID reader (LIDR) 25 to identify and localize a variety of assets 21d-21g. In this embodiment, LIDR 25 merges the capabilities of ID tag reader 28 and RTLS tag 24c. LIDR 25 further may convey data to a computer or server 23, as well as support additional user interface capabilities for providing feedback to healthcare worker 18. In this embodiment, RTLS tag 24c is a passive RTLS tag, detecting signal 102 and achieving localization in a manner described more fully in applicant's "System and method for near-field electromagnetic ranging," (Ser. No. 10/355,612 filed Jan. 31, 2003, now U.S. Pat. No. 6,963,301), applicant's co-pending "Method and apparatus for determining location using signals-of-opportunity," (Ser. No. 12/796,643; filed Jun. 8, 2010), and applicant's co-pending "Near-field electromagnetic location system and method," (Ser. No. 12/977,067; filed Dec. 23, 2010). Signal 102 may be a signal-of-opportunity from an AM broadcast station 103 as shown, an alternate signal-of-opportunity, a beacon signal, or other RF or acoustic signal. A beacon signal may be a near-field signal or a far-field signal. All three of the applications noted above are herein incorporated by reference. Note that passive RTLS tag 24c provides a decentralized localization, calculating its own location without need of any infrastructure (other than signals of opportunity 102). In alternate embodiments, however, RTLS tag 24c may be an active RTLS tag, or an alternate technology RTLS tag.

RTLS tag 24c may employ compact and/or orthogonal antenna systems such as those described in applicant's "Near field location system and method," (Ser. No. 11/272,533; filed Nov. 10, 2005, now U.S. Pat. No. 7,307,595), applicant's "Space efficient magnetic antenna system," (Ser. No. 11/473, 595; filed Jun. 22, 2006, now U.S. Pat. No. 7,755,552), applicant's co-pending "Space efficient magnetic antenna method," (Ser. No, 12/834,821; filed Jul. 12, 2010), and applicant's co-pending "Planar antenna system," (Ser. No. 12/857, 528; filed Aug. 16, 2010). All four applications are herein incorporated by reference.

ID tag reader 28 reads and identifies ID tags 26d-26j associated with respective assets 21d-21g. Patient 21d wearing ID tag 26d may be identified and localized by LIDR 25. Medication 21e with attached ID tag 26e may be identified and localized by LIDR 25. Moveable equipment or tools such as IV Pump 21f with associated ID tag 26f may be identified and localized by LIDR 25. Fixed assets like hand-washing sink 21g with associated ID tag 26g may be identified and localized by LIDR 25. In each case, the identification and localization data obtained by LIDR 25 may be made available in a database on computer or server 23 an as to aid health care managers and analysts to confirm that the correct treatments and services are provided to patient 21d, and to quantify that service in support of billing as well as visibility and improvement of the healthcare process. Data on server 23 may be made available elsewhere via network 101. Network 101 may be protected from unwanted access using applicant's co-pending "Malicious attack response system and method," (Ser. No. 12/843,002; filed Jul. 23, 2010) which is herein incorporated by reference.

In Applicants' invention, a relatively low number of active tags (as low as one if only a single mover is employed) can be "reused" multiple times in succession for tracking different passive tagged assets, drastically improving the economics of asset tracking in a logistics, warehouse, healthcare, or other environment. Thus Applicants' proposed combination of low number of RTLS tagged carriers in temporary association with a potentially large number of ID tagged assets yields synergies beyond what would be predicted by one of ordinary skill in the art.

Near-Field Location System

In a preferred embodiment, the RTLS tag and optional locating receiver of the present invention are based on transmitting and receiving near field signals. Location by near field signals is fully described in the US patents and patent applications incorporated by reference above. In summary, near field signals are signals received within a near field of the transmitter. The near field is best within ⅙ wavelength, but the effects may be utilized out to one wavelength or so. Near field signals show unique amplitude and phase changes with distance from the transmitter. In particular E field and H field antennas couple in different ways to the signal with different amplitude decay profiles and different signal phase changes with distance. These amplitude and phase profiles may be used to measure distance. In particular, by comparing E field and H field phase or E field and H field amplitude, distance may be determined by referring to the theoretical predictions for the measured property as a function of distance. Alternatively, the signal properties may be pre-measured for a particular site to account for site specific disturbances and the range measurement compared with previously measured data. An E field antenna is typically a whip antenna and may be on the order of a meter in length for a 1 MHz signal. An H field antenna is typically a coil and may include a ferrite core. The H field antenna may be on the order of a few centimeters in length, width, and height. Thus, it can be advantageous to utilize magnetic antennas for mobile units because of the compact size and to use both E field and H field antennas for the fixed units because of the size of the whip antenna. In some situations however, the reverse may be desired. Numerous variations are disclosed in the applications incorporated by reference above.

In particular, an often preferred configuration utilizes a magnetic antenna (H field antenna) for the mobile beacon transmitter (active RTLS tag) and a vertically polarized E field antenna with two orthogonally oriented H field antennas for each of the fixed receiver locations. The two H field antennas have the null axes in the horizontal plane. An exemplary signal set from this arrangement includes:

E, Electric field strength from the E field antenna
H1, magnetic field strength from the first H field antenna
H2, magnetic field strength from the second field antenna EH1, phase angle between E and H1 signals EH2, phase angle between E and H2 signals Thus, multiple determinations of range my be made from this configuration by making different comparisons between E field and H field amplitude and phase. Typically, a weighted average of available determinations is used based on the strongest or most reliable signals from the set.

To find a position within an area, as needed for the exemplary warehouse example, typically multiple receivers are positioned to allow triangulation based on multiple range measurements, i.e., to each location receiver from the active RTLS tag. If height is desired, additional receivers may be deployed to improve the height resolution. The receivers may be connected to a central computer for combining the measurements from all receivers to determine location. The connection may be by wired or wireless network or other methods as desired.

In a further alternative embodiment, the area may be pre-measured to account for specific local propagation disturbances and to reduce errors from equipment variations. A calibration set of measurements is made by placing an active RTLS tag or a passive RTLS tag at known locations and measuring the signals and phases at all receivers. A finer grid, or set of grids, of locations may be generated from extrapolation and interpolation from the measured locations. In operation, an unknown location is determined by transmitting from the unknown location and comparing the set of measured data from all receivers with the stored calibration data to find a location having the best match. Alternately, a passive RTLS tag may compare received signals with the stored calibration data to find a location having the best match. Best match may be determined by summing absolute value of the differences between each respective signal from each receiver, the best match being the lowest sum. In the sum, amplitudes and phases may be scaled to have similar effect on the sum. Weak signals may be ignored. Other criteria may be applied to weight each element. Other matching criteria such as sum of squared differences or other error criteria may be used. In one embodiment, a location is determined as the centroid of a region having an error value above a predetermined threshold. In further embodiments, motion constraints, such as walls and motion dynamics including momentum are used to improve position.

Locator-Receiver Functional Block Diagram

Figure 7:
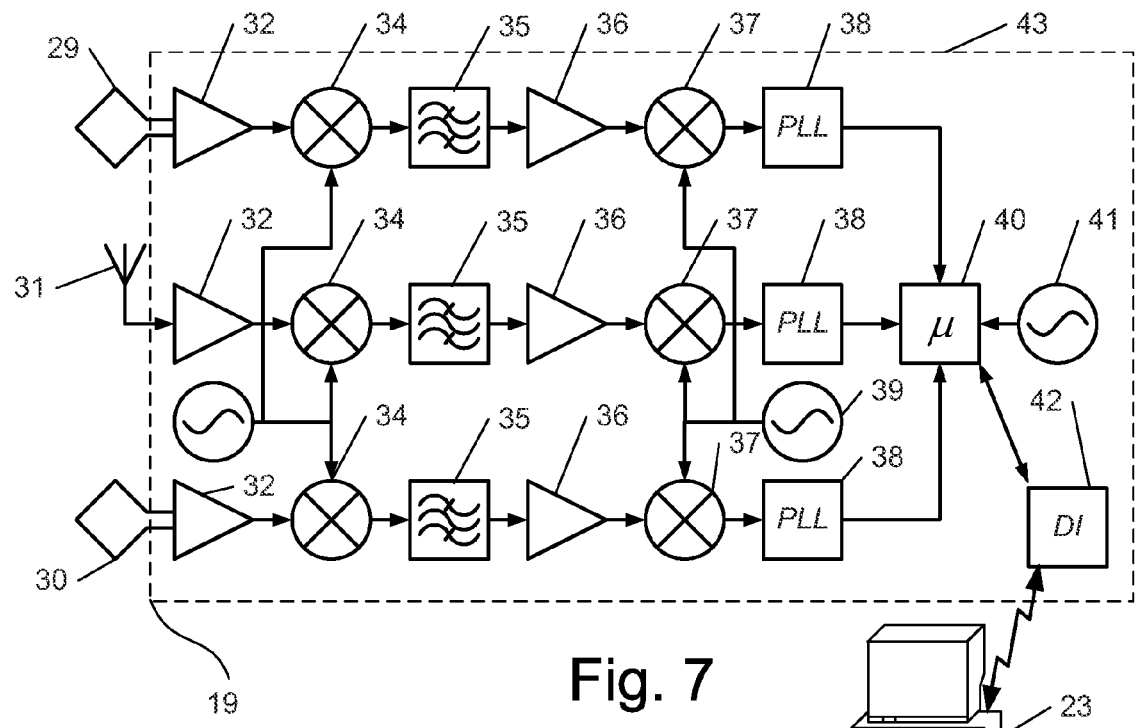
FIG. 7 is a functional block diagram showing an exemplary near field locator receiver for use in conjunction with an asset and personnel location, identification, and movement system.

FIG. 7 is a functional block diagram showing an exemplary near field locator receiver 19 for use in conjunction with an asset and personnel location, identification, and movement system. In a preferred embodiment, locator receiver 19 comprises a first magnetic antenna 29, an electric antenna 31, a second magnetic antenna 30 (collectively, "three antennas"), and locator receiver board 43. Locator receiver board 43 comprises first (pre-) amplifiers 32, and first mixers 34 that mix RF signals from three antennas with a signal from first local oscillator 68 to yield intermediate frequency (IF) signals. Band pass filters 35 and second amplifiers 36 convey IF signals to second mixers 37 that mix IF signals with a signal from a second local oscillator to yield baseband signals. Phase lock loops 38 stabilize response, increase stability, and reduce noise of baseband signals. A microprocessor 40 compares baseband signals to timing signals from clock 41 to measure phase differences between baseband signals. In one embodiment, the signals E, H1, H2, EH1, and EH2 as described above being E field and H field magnitudes and phases are measured by the receiver. Microprocessor 40 conveys results to computer 23 via data interface 42. Data interface 42 may be a wired or wireless data network capable of transferring data between microprocessor 40 and computer 23.

Figure 8:
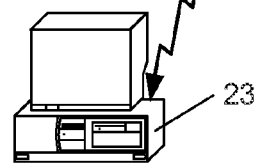
FIG. 8 is a mechanical diagram showing a side view of a locator receiver for use in conjunction with an asset and personnel location, identification, and movement system.
Figure 8:
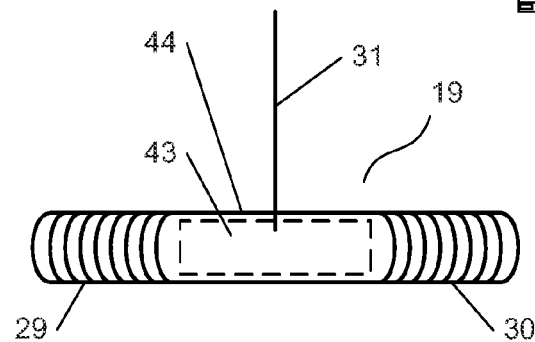

FIG. 8 is a mechanical diagram showing a side view of a locator receiver 19 for use in conjunction with an asset and personnel location, identification, and movement system. Locator receiver 19 comprises first magnetic antenna 29, electric antenna 31, second magnetic antenna 30, locator receiver board 43, and enclosure 44. First magnetic antenna 29 and second magnetic antenna 30 are arranged so as to have mutually orthogonal nulls oriented in the plane of the floor of the warehouse.

Figure 9:
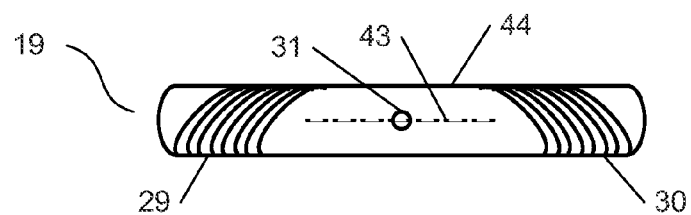
FIG. 9 is a mechanical diagram showing a top view of a locator receiver for use in conjunction with an asset and personnel location, identification, and movement system.

FIG. 9 is a mechanical diagram showing a top view of a locator receiver 19 for use in conjunction with an asset and personnel location, identification, and movement system. Locator receiver 19 comprises first magnetic antenna 29, electric antenna 31, second magnetic antenna 30, locator receiver board 43, and enclosure 44. First magnetic antenna 29 and second magnetic antenna 30 are arranged so as to have mutually orthogonal nulls with null axes in the horizontal plane. FIG. 9 shows the first magnetic antenna 29 and second magnetic antenna 30 as exemplary coils 29 and 30 respectively. FIG. 9 further illustrates the exemplary coils 29 and 30 wound on the enclosure 44 which is used as a coil form 44 for coils 29 and 30. Note the diagonal winding of the coils 29 and 30 on the linear coil form 44. The diagonal winding is to rotate the null axis 45 degrees relative to the axis of the form 44 so that the null axes of the two coil null axes for coils 29 and 30 may be orthogonal, 90 degrees from one another.

Active RTLS Tag Functional Block Diagram

Figure 10:
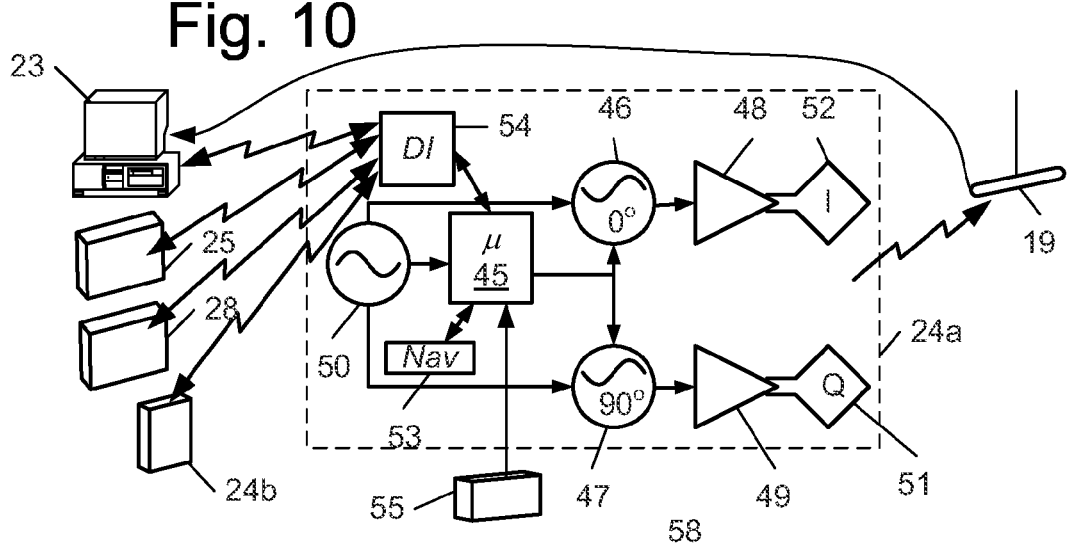
FIG. 10 is a functional block diagram showing an exemplary active RTLS tag for use in conjunction with an asset and personnel location, identification, and movement system.

FIG. 10 is a functional block diagram showing an exemplary active RTLS tag for use in conjunction with an asset and personnel location, identification, and movement system. Active RTLS tag 24a comprises a clock or frequency reference 50, a microprocessor 45, a data interface 54, a navigation sensor and/or other sensors 53, a first RF oscillator 46, a second RF oscillator 47, a first RF amplifier 48, a second RF amplifier 49, a first (I) magnetic antenna (52), and a second (Q) magnetic antenna (51), and, if provided, a lift position sensor 55 for a forklift.

A data interface 54 provides for data to be conveyed to or received from the computer 23 or other devices on the network, such as an LIDR 25, an ID tag reader 28, or another active RTLS tag 24b. The data interface 54 may be a wireless data network such as ZigBee®, WiFi®, or other network or communication link. In alternate embodiments, data interface 54 may be a receive-only simplex link and signals generated by a first (I) magnetic antenna 52 and a second (Q) magnetic antenna 51 may be modulated to transmit data.

In a preferred embodiment, the first RF amplifier 48 and the second RF amplifier 49 have an input power of 50 mW so that active RTLS tag 24 is in compliance with FCC regulations Part 15.219. Also in a preferred embodiment, a first RF oscillator 46, and a second RF oscillator 47 are phase offset so as to yield a quadrature transmit signal with omni-directional properties, i.e., first magnetic antenna is driven 90 degrees out of phase with respect to second magnetic antenna. Signals generated by a first (I) magnetic antenna 52 and a second (Q) magnetic antenna 51 cooperate to yield a near-field signal which may be detected by one or more locator receivers 19 to determine the location coordinates of the active RTLS tag.

The active RTLS tag may also include an optional navigation sensor 53. The navigation sensor may include one or more of a magnetic compass, odometer, accelerometer, speedometer, gyro, turn sensor, or other devices that may assist the RF positioning system in determining a position or orientation. Navigation may be used to filter noisy RF position measurements, to dead reckon in locations with weak RF coverage, or to provide additional dimensions of measurement, such as azimuth orientation of the forklift. In one embodiment, a motion sensor, such as an accelerometer, may be used to detect motion related to unauthorized movement of assets.

ID Tag Reader Functional Block Diagram

Figure 11:
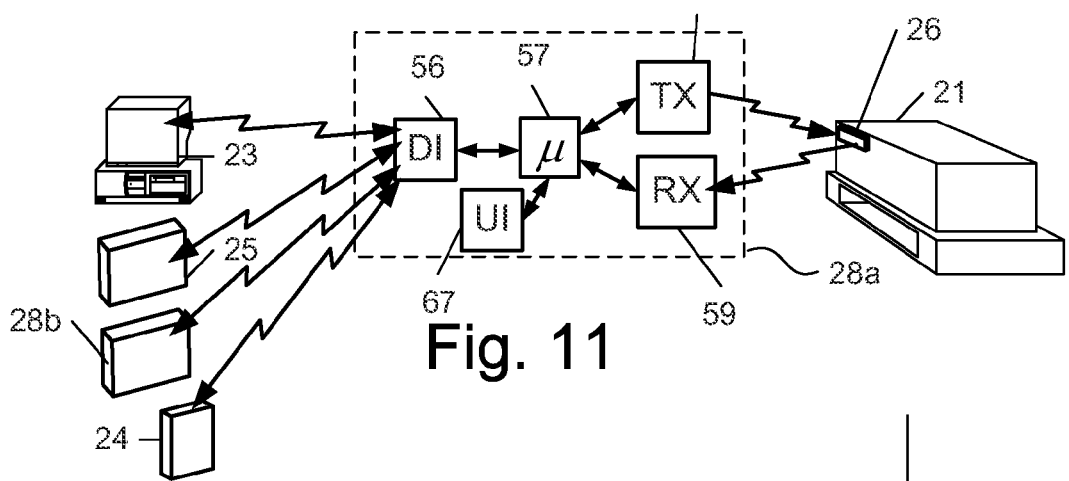
FIG. 11 is a functional block diagram showing an exemplary ID tag reader for use in conjunction with an asset and personnel location, identification, and movement system.

FIG. 11 is a functional block diagram showing an exemplary ID tag reader 28 for use in conjunction with an asset and personnel location, identification, and movement system. ID tag reader 28a comprises data interface 56, microprocessor 57, transmitter 58, and receiver 59.

A data interface 56 provides for data to be conveyed to or received from a computer 23 or other devices on the network such as an LIDR 25, another ID tag reader 28b, or an active RTLS tag 24. A data interface 54 may be a wireless data network such as ZigBee®, or other network.

The ID tag reader also includes an operator switch to initiate an ID reading. The switch may also initiate a location reading from the active RTLS tag. In one embodiment, upon receipt of an ID reading by the computer 23, the computer will initiate a location reading, from the active RTLS tag that is associated with the ID reader as set up in the computer software.

Transmitter 58 excites ID tag 26 and receiver 59 receives identifying information from ID tag 26. In a preferred embodiment, ID tag 26 combines a bar code and an RFID device. ID tag reader 58 uses a laser to read the bar code of ID tag 26, and an RFID reader to receive data from an RFID chip embedded in ID tag 26. In alternate embodiments, optical pattern or other technologies may be incorporated in ID tag 26.

ID tag readers typically have a short operational range, thus the positioning of the mover together with the reading of the ID tag indicates the ID tag and associated asset are close to the location of the mover. By proper training of the worker to, for example, perform location and identification operations with the forklift directly in front of and close to the asset, the measurements may be made more accurate and repeatable.

ID tag reader 28a further includes user interface 67. User interface 67 can convey such information to worker 18 as a destination, status, or other information pertinent to asset 21 in particular and the logistics process in general.

Locating Identification Reader (LIDR)

Figure 12:
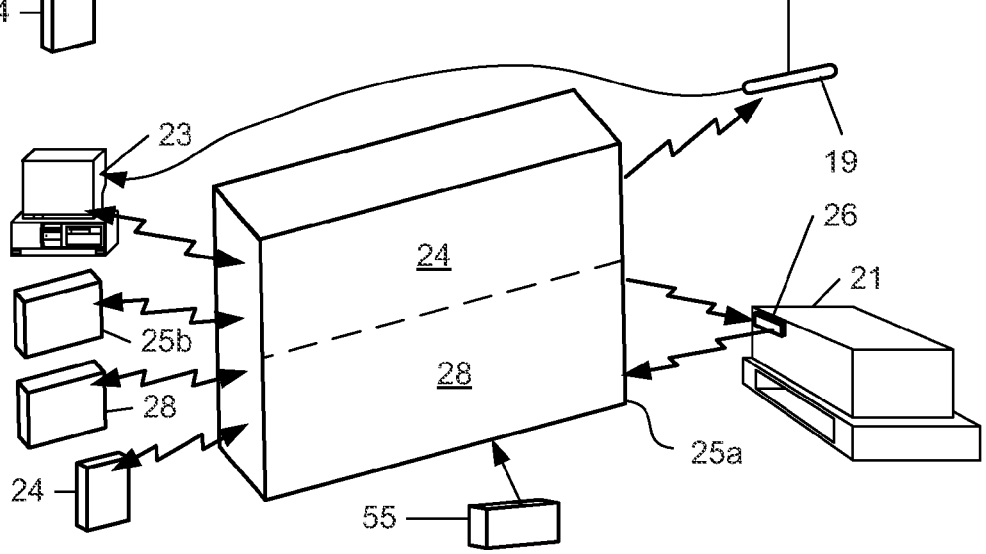
FIG. 12 is a block diagram showing interfaces for an exemplary LIDR for use in conjunction with an asset and personnel location, identification, and movement system.

FIG. 12 is a block diagram showing interfaces for an exemplary LIDR 25 for use in conjunction with an asset and personnel location, identification, and movement system. The LIDR 25 combines the functionality of RTLS tag 24 and ID tag reader 28 in a single device package. A LIDR 25 may include data interfaces for data to be conveyed to or received from a computer 23 or other devices on the network such as another LIDR 25, an ID tag reader 28, or an active RTLS tag 24. A LIDR 25 radiates a signal capable of being localized by a locator-receiver 19, or embodies other passive RTLS or alternate technology RTLS capability. A LIDR 25 also can interrogate ID tag 26 so as to acquire identification data pertinent to asset 21.

The LIDR may be mounted on a moving vehicle such as a forklift, hand truck, pallet jack or other vehicle, or may be carried by a worker. Advantages of the LIDR include the fixed association of the active RTLS tag and ID reader, the convenience of having both devices in one package, and the sharing of interface, battery and computer resources.

Alternate Embodiment Active RTLS Tag Mechanical Diagram

Figure 13:
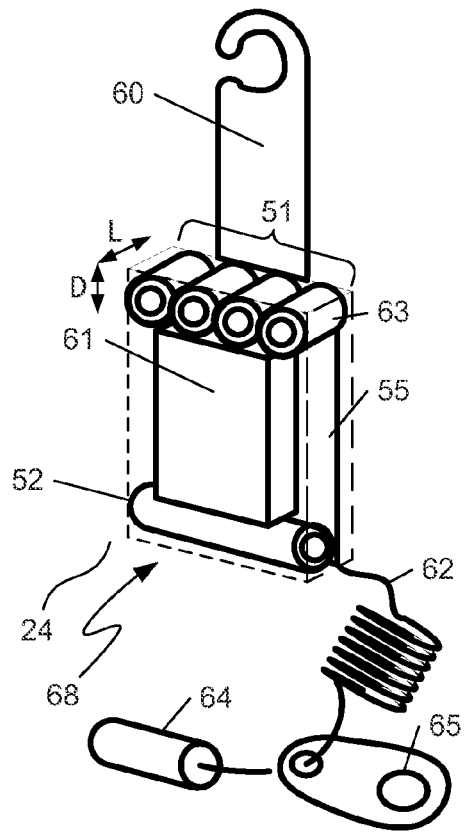
FIG. 13 is a mechanical diagram showing an alternate embodiment active RTLS tag for use in conjunction with an asset and personnel location, identification, and movement system.

FIG. 13 is a mechanical diagram showing an alternate embodiment active RTLS tag 68 for use in conjunction with an asset and personnel location, identification, and movement system, Alternate embodiment active RTLS tag 68, battery 61, first magnetic antenna 51 comprising a plurality of hollow core magnetic antennas 63, second (Q) magnetic antenna comprising an orthogonal hollow core magnetic antenna 52, hanger 60, power cord 62, power jack 64 and power outlet cover holder 65.

Short magnetic antennas cylindrical cores with a small length to diameter ratio (L/D<~10) tend not to have an effective permeability ($\mu_e$) much greater than ten no matter what the effective bulk permeability of the bulk core material (see for instance M. F. "Doug" DeMaw, *Ferromagnetic Core Design & Application Handbook*, Starkville, Miss.: MFJ Publishing Company, 1996, p. 41). The inventors have discovered that if a core is relatively short (L/D<~10) hollow cores (like those of hollow core magnetic antennas 63) yield performance comparable to those of analogous solid cores. Hollow cores are advantageous because of less material and therefore lower weight and less cost.

In preferred embodiments, hanger 60 is preferentially relatively stiff and allows alternate embodiment active RTLS tag 68 to be substantially rigidly mounted on a rear-view mirror of a vehicle or other placement. The relative stiffness of hanger 60 prevents alternate embodiment active RTLS tag 68 from substantial swinging that might impair stability or performance. Hanger 60 makes alternate embodiment active RTLS tag 68 well-suited for use in conjunction with tracking rental or other vehicles or for tracking forklifts. Power cord 62 and jack 64 cooperate to allow alternate embodiment active RTLS tag 68 to be plugged into a standard 12V ("cigarette tighter") car power jack or other power outlet.

Inventory Control System

Figure 14:
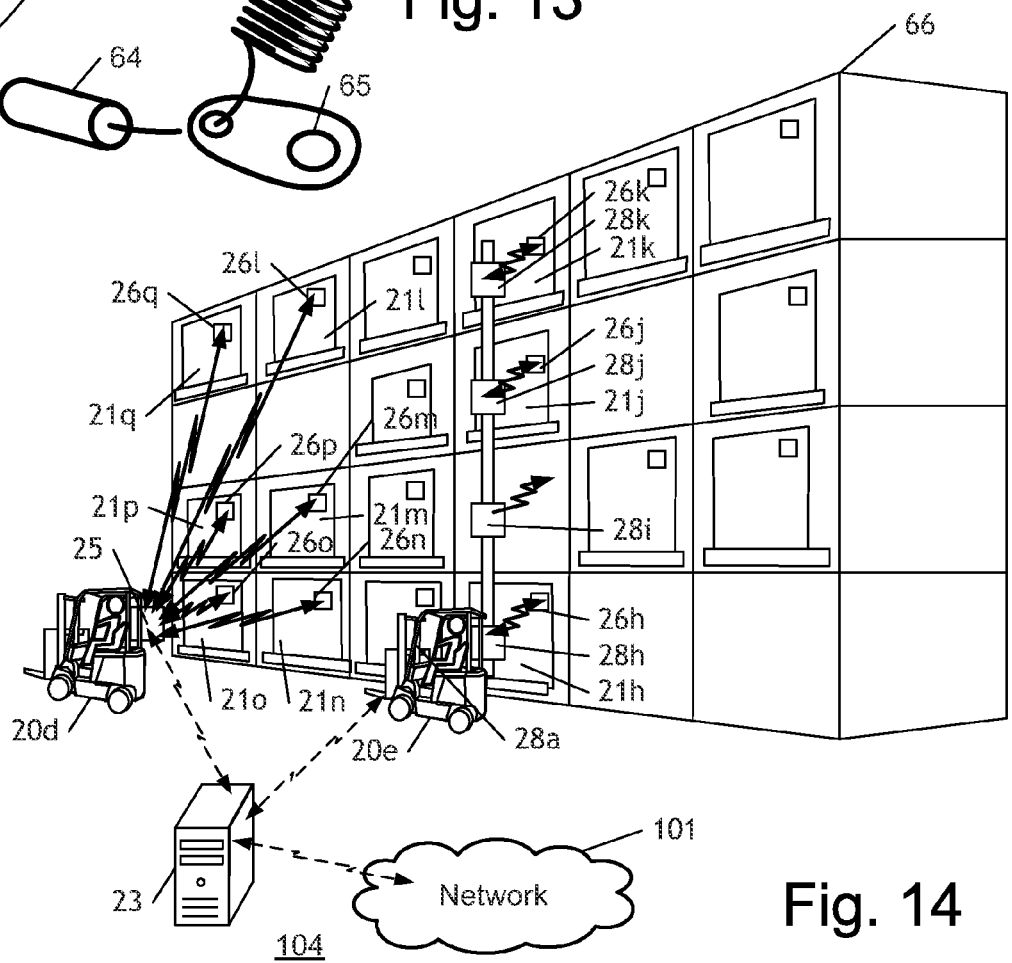
FIG. 14 is a schematic diagram showing an inventory control system.

FIG. 14 is a schematic diagram showing an inventory control system 104. In alternate embodiment inventory control system 104, stationary assets (for instance asset 21h, asset 21j, and asset 21k) in an inventory area (such as that containing 66) remain stationary while a mover (like forklift 20d) traverses the inventory area employing LIDR 25 to read a collection of asset tags (for instance asset tag 26l, asset tag 26m, asset tag 26n, asset tag 26o, asset tag 26p, and asset tag 26q) associated with particular assets (asset 21l, asset 21m, asset 21n, asset 21o, asset 21p, and asset 21q, respectively). LIDR 25 can identify multiple assets by interrogating or reading multiple asset tags simultaneously, associate their identification with a particular location, and convey the appropriate data to server 23. This association occurs while a mover is in known relative proximity to an asset. However, a long ID tag read range necessarily introduces a certain ambiguity in location. Certain ID tag read techniques (for instance, optical, laser, or IR) can read an ID tag, locate it in a field of view, and thus also comprise an alternate direction measuring device configured to measure the direction of an extension from a LIDR 25 so as to provide a more refined location. In an alternate embodiment multiple more short range ID tag readers (like ID tag reader 28h, ID tag reader 28i, ID tag reader 28j, and ID tag reader 28k) can be employed to simultaneously read multiple ID tags (for instance asset tag 26h, asset tag 26j, and asset tag 26k) associated with particular assets (asset 21h, asset 21j, and asset 21k, respectively).

An automated inventory control system 104 subjects assets in inventory to periodic identification and localization in support of a variety of goals. Inventory control system 104 is useful for providing a double-check or confirmation that assets are present in the appropriate locations, whether for audit, regulatory, contractual, financial, or other reasons.

An Inventory Control Method

Figure 15A:
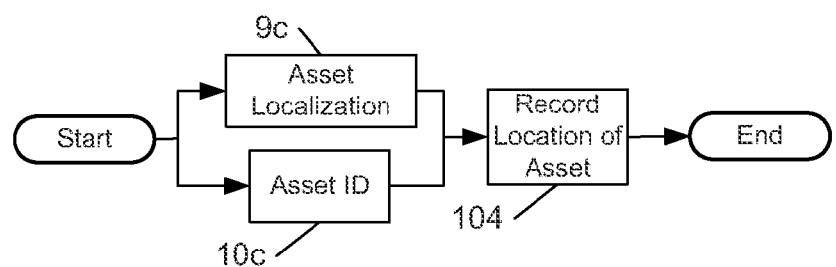
FIG. 15A is an exemplary process flow diagram showing an inventory control method in accordance with the present invention.

FIG. 15a is an exemplary process flow diagram showing an inventory control method in accordance with the present invention. Of significance with respect to the steps of FIG. 15a is that the localization equipment is installed on or otherwise associated with the mover, as is the reader. A low cost ID tag is attached or otherwise associated with the asset. Referring to FIG. 15a, the process may begin in any order with asset identification 10c and asset localization 9c. Asset identification 10c is the step wherein an ID reader or ID tag reader interrogates or otherwise detects ID tags associated with assets (asset tags). Asset localization 9c is the step wherein localization equipment, such as an active wireless RTLS tag, passive RTLS tag, or alternate technology RTLS tag is employed in localization, determining the location of an associated mover. The mover may be a vehicle such as a forklift, a robot, a manually operated mover such as a hand truck or lift jack, or a person.

The determined location of the mover may then be associated with the appropriate asset and recorded as in asset location recording step 104. Asset location recording step 104 involves associating location coordinates (based on the determining location coordinates for the mover from asset localization step 9c) with the asset (whose identity was determined in asset identification step 10c). This association occurs while a mover is in known relative proximity to an asset. Asset location recording step 104 may further involve recording an asset location in a database on a server or a computer, or otherwise making asset location data available in service of other goals. The step of asset identification 10c and the step of asset localization 9c may be performed by a single organic device incorporating both functions, such as a LIDR.

Note that in the sense of the inventory control process of FIG. 15a, the mover does not move the asset. As a mover (for instance a forklift, robot, or person) traverses or moves around an inventory area, the inventory control process of FIG. 15a is repeated multiple times, one for each asset detected in an inventory area. The inventory control process of FIG. 15a greatly speeds and automates inventory control particularly compared to manual methods of verification.

Figure 15B:
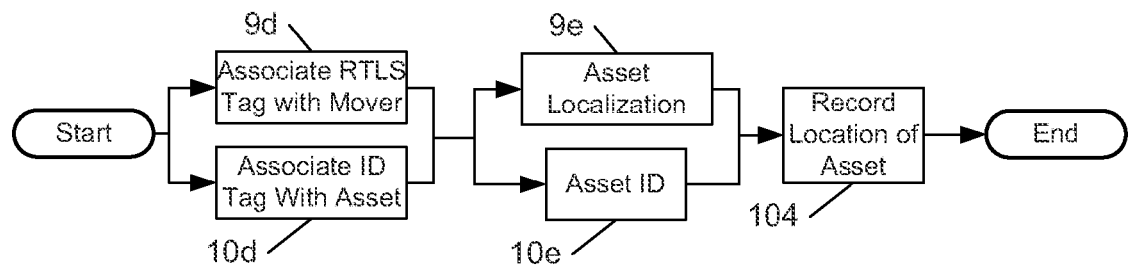
FIG. 15B is an alternate exemplary process flow diagram showing an inventory control method in accordance with the present invention.

FIG. 15b is an alternate exemplary process flow diagram showing an inventory control method in accordance with the present invention. The inventory control process of FIG. 15b begins (in no particular order) with the parallel steps of associating an RTLS tag with a mover 9d and associating an ID tag with an asset 10d. Then the inventory control process of FIG. 15b continues (in any order) with asset identification 10e and asset localization 9e. The inventory control process of FIG. 15b makes explicit the step of associating an RTLS tag with a mover 9d implicit in the asset localization step 9c. The inventory control process of FIG. 15b also makes explicit the step of associating an ID tag with an asset 10d implicit in the asset identification step 10c.

Other sequences of localization and identification may be desirable for other scenarios. Thus, the localization, identification, and a comprehensive, low-cost inventory control system may be accomplished without installing expensive RTLS tags on each asset.

Conclusion

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

While various embodiments of the present invention have been described above, it should be understood that they have been presented by way of example only, and not limitation. One should understand that numerous variations may be made by one skilled in the art based on the teachings herein. Thus, the breadth and scope of the present invention should not be limited by any of the above-described exemplary embodiments, but should be defined only in accordance with the following claims and their equivalents.

We claim:

1. An inventory control method comprising:
    identifying an asset comprising the steps of:
        associating an identification tag with the asset; and
        reading the identification tag with an ID tag reader physically associated with a mover, the mover having an RTLS tag thereon;
    logically associating the asset with the RTLS tag;
    determining location coordinates for the mover;
    logically disassociating the asset from the RTLS tag;
    recording location coordinates of the asset based on the determining location coordinates for the mover.

2. The inventory control method of claim 1, wherein the RTLS tag is an active RTLS tag.

3. The inventory control method of claim 1, wherein the RTLS tag is a passive RTLS tag.

4. The inventory control method of claim 3, wherein the passive RTLS tag employs signals-of-opportunity in determining a location.

5. The inventory control method of claim 1, wherein the identification tag is an RFID tag.

6. The inventory control method of claim 1 wherein the identification tag is an optical barcode label.

7. The inventory control method of claim 1, further including the step of determining the location coordinates for said asset by measured extension from the location coordinates for said mover.

8. The inventory control method as in claim 1, wherein said mover comprises a person.

9. The inventory control method as in claim 1, wherein said mover comprises a robot.

10. An inventory control system comprising:
    an RTLS tag associated with a mover for determining location of the mover;
    an ID tag reader associated with the mover, the ID tag reader for determining identification of an asset from an ID tag associated with an asset;
    a computer in communication with the RTLS tag and the ID tag reader for recording a location of the asset, the computer configured for associating the location of the mover with the identification of the asset.

11. The inventory control system of claim 8:
    wherein the RTLS tag is an active RTLS tag for transmitting a location signal;
    and further comprising:
        a set of locator receivers for receiving the location signal;
        a computer in communication with the set of locator receivers,
            the computer configured for receiving measurements of the location signal made by the set of locator receivers, and the computer determining location coordinates of the active RTLS tag based on the measurements of the location signal.

12. The inventory control system of claim 8 wherein the RTLS tag is an active RTLS tag for transmitting a location signal; and further comprising a set of locator receivers for receiving the location signal and determining location coordinates of the active RTLS tag based on the measurements of the location signal; the set of locator receivers in communication with the computer, wherein the computer is configured for receiving location coordinates of the active RTLS tag from the set of locator receivers.

13. The inventory control system of claim 8, wherein the RTLS tag is a passive RTLS tag.

14. The inventory control system of claim 11, wherein the passive RTLS tag employs signals-of-opportunity in determining a location.

15. The inventory control system of claim 8, wherein the identification tag is an RFID tag.

16. The inventory control system of claim 8 wherein the identification tag is an optical barcode label.

17. The inventory control system of claim 8, further including the step of determining the location coordinates for said asset by measured extension from the location coordinates for said mover.

18. The inventory control system as in claim 8, wherein said mover comprises a person.

19. An inventory control system comprising:
an active RTLS tag for transmitting a location signal;
means for determining location coordinates for the active RTLS tag based on the location signal;
an ID tag reader in communication with a computer, said ID tag reader for reading an asset identification from an ID tag associated with an asset in an inventory area;
a mover for carrying the ID tag reader and the active RTLS tag to a plurality of locations within the inventory area;
wherein the location coordinates for the active RTLS tag are determined by the means for determining the location coordinates while the active RTLS tag is in a known relative proximity to the asset;
wherein the inventory control system obtains an estimation of location coordinates for the asset from the location coordinates for the active RTLS tag, and
wherein the inventory control system is configured for associating the location coordinates for the asset with the asset identification.

20. The inventory control system of claim 17 wherein the estimation further includes the step of determining location coordinates for the asset by measured extension from the location coordinates for said mover.

21. The inventory control system as in claim 17, wherein the mover is a person.

22. The inventory control system as in claim 17, wherein the mover is a robot.

* * * * *